(12) United States Patent
Nakayama et al.

(10) Patent No.: US 11,536,371 B2
(45) Date of Patent: Dec. 27, 2022

(54) SEALING DEVICE AND METHOD FOR ASSEMBLING SAME

(71) Applicant: NOK CORPORATION, Tokyo (JP)

(72) Inventors: Kenichi Nakayama, Ibaraki (JP); Masashi Suzuki, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 140 days.

(21) Appl. No.: 16/759,497

(22) PCT Filed: Jan. 16, 2019

(86) PCT No.: PCT/JP2019/001074
§ 371 (c)(1),
(2) Date: Apr. 27, 2020

(87) PCT Pub. No.: WO2019/171771
PCT Pub. Date: Sep. 12, 2019

(65) Prior Publication Data
US 2020/0292081 A1 Sep. 17, 2020

(30) Foreign Application Priority Data

Mar. 9, 2018 (JP) .............................. JP2018-042707

(51) Int. Cl.
*F16J 15/32* (2016.01)
*F16K 5/06* (2006.01)
(Continued)

(52) U.S. Cl.
CPC ........... *F16J 15/32* (2013.01); *F16J 15/3452* (2013.01); *F16J 15/38* (2013.01); *F16K 5/0689* (2013.01); *F16K 5/14* (2013.01)

(58) Field of Classification Search
CPC .......... F16J 15/32; F16J 15/3452; F16J 15/38; F16J 15/3464; F16J 15/20; F16J 15/24
See application file for complete search history.

(56) References Cited

U.S. PATENT DOCUMENTS 3,037,738 A    6/1962   Jackson
3,416,808 A   *   12/1968   Voitik ...................... F16J 15/38
                                                           277/373
(Continued)

FOREIGN PATENT DOCUMENTS

DE     11 2014 002 468     2/2016
GB         1 486 934     9/1977
(Continued)

OTHER PUBLICATIONS

Japan Official Action received in JP application No. 2020-504828, dated Oct. 20, 2020.
(Continued)

*Primary Examiner* — Christine M Mills
*Assistant Examiner* — L. Susmitha Koneru
(74) *Attorney, Agent, or Firm* — Greenblum & Bernstein, P.L.C.

(57) ABSTRACT

A sealing device includes: a housing; a seal ring configured to be axially displaceably inserted along an inner circumference of the housing, the seal ring including a front-end surface and a rear-end surface which defines packing mounting space; a packing configured to establish sealing between the housing and the seal ring, the packing being disposed in the packing mounting space; and spring means disposed on the rear-end surface side of the seal ring to elastically bias the seal ring toward the front-end surface side.

11 Claims, 6 Drawing Sheets

(51) Int. Cl.
*F16J 15/38* (2006.01)
*F16J 15/34* (2006.01)
*F16K 5/14* (2006.01)

(56) References Cited

U.S. PATENT DOCUMENTS

| | | | | |
|---|---|---|---|---|
| 4,268,232 | A * | 5/1981 | Haupt | F16J 15/40 |
| | | | | 277/353 |
| 4,637,421 | A * | 1/1987 | Stunkard | F16K 5/0673 |
| | | | | 251/315.08 |
| 4,900,039 | A * | 2/1990 | Klecker | F16J 15/008 |
| | | | | 277/320 |
| 9,617,994 | B2 * | 4/2017 | Walters | F04C 2/3448 |
| 2008/0315144 | A1 | 12/2008 | Thomas | |

FOREIGN PATENT DOCUMENTS

| | | | |
|---|---|---|---|
| JP | 50-94532 A | 7/1975 |
| JP | 52-22681 B2 | 6/1977 |
| JP | 2015-96747 A | 5/2015 |

OTHER PUBLICATIONS

International Search Report issued in International Patent Application No. PCT/JP2019/001074, dated Mar. 26, 2019, English translation.

German Office action issued with respect to German Application No. 112019001237.1, dated Feb. 18, 2022 and partial English translation (as obtained from Google Translate).

* cited by examiner

SEALING DEVICE AND METHOD FOR ASSEMBLING SAME

FIELD

The present disclosure relates to a sealing device and a method of assembling the same.

BACKGROUND

Recently, the automobile industry has been actively developing fuel-efficient vehicles in consideration of environmental problems. For the purpose of improving the fuel performance, what has been developed is a flow control valve which controls fluid such as oil or coolant. The flow control valve is equipped with a valve-use seal.

A conventionally known valve-use seal is a sealing device 111 shown in FIG. 5 (Japanese Patent Application Publication No. 2015-96747, hereinafter referred to as "Patent Literature 1"). In the conventional sealing device 111, a front-end surface 113a of a seal ring 113 which is elastically biased by a spring means 115 is pressed against an outer surface 121a of a valve rotor 121, to establish sealing between the seal ring 113 and the valve rotor 121. A packing 114 disposed between a housing 112 and the seal ring 113 establishes sealing against a clearance c between the housing 112 and the seal ring 113.

Note that, the outer surface 121a of the valve rotor 121 is often a spherical or cylindrical surface. Correspondingly, the front-end surface 113a of the seal ring 113 is also a spherical or cylindrical surface.

BRIEF SUMMARY

Technical Problem

Figure 5:
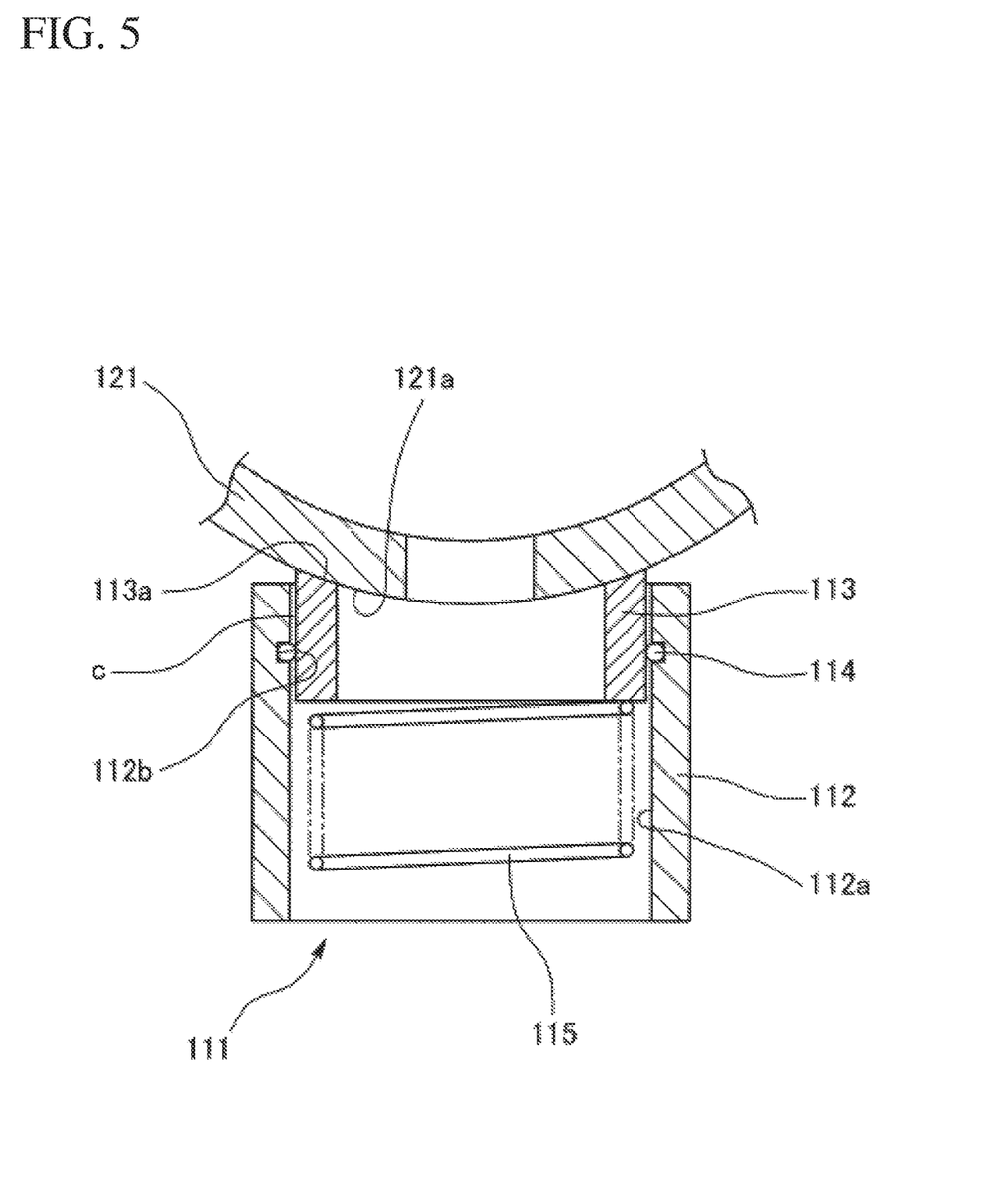
FIG. 5 is a cross-sectional view of a sealing device of a conventional technique.

As shown in FIG. 5, when the outer surface 121a of the valve rotor 121 is a cylindrical surface and correspondingly the front-end surface 113a of the seal ring 113 is also a cylindrical surface, in order for the front-end surface 113a of the seal ring 113 to be in contact with the outer surface 121a of the valve rotor 121 over the entire circumference of the ring, the center axis of the cylindrical surface which is the front-end surface 113a of the seal ring 113 must be accurately aligned with the center axis of the cylindrical surface which is the outer surface 121a of the valve rotor 121.

Figure 6:
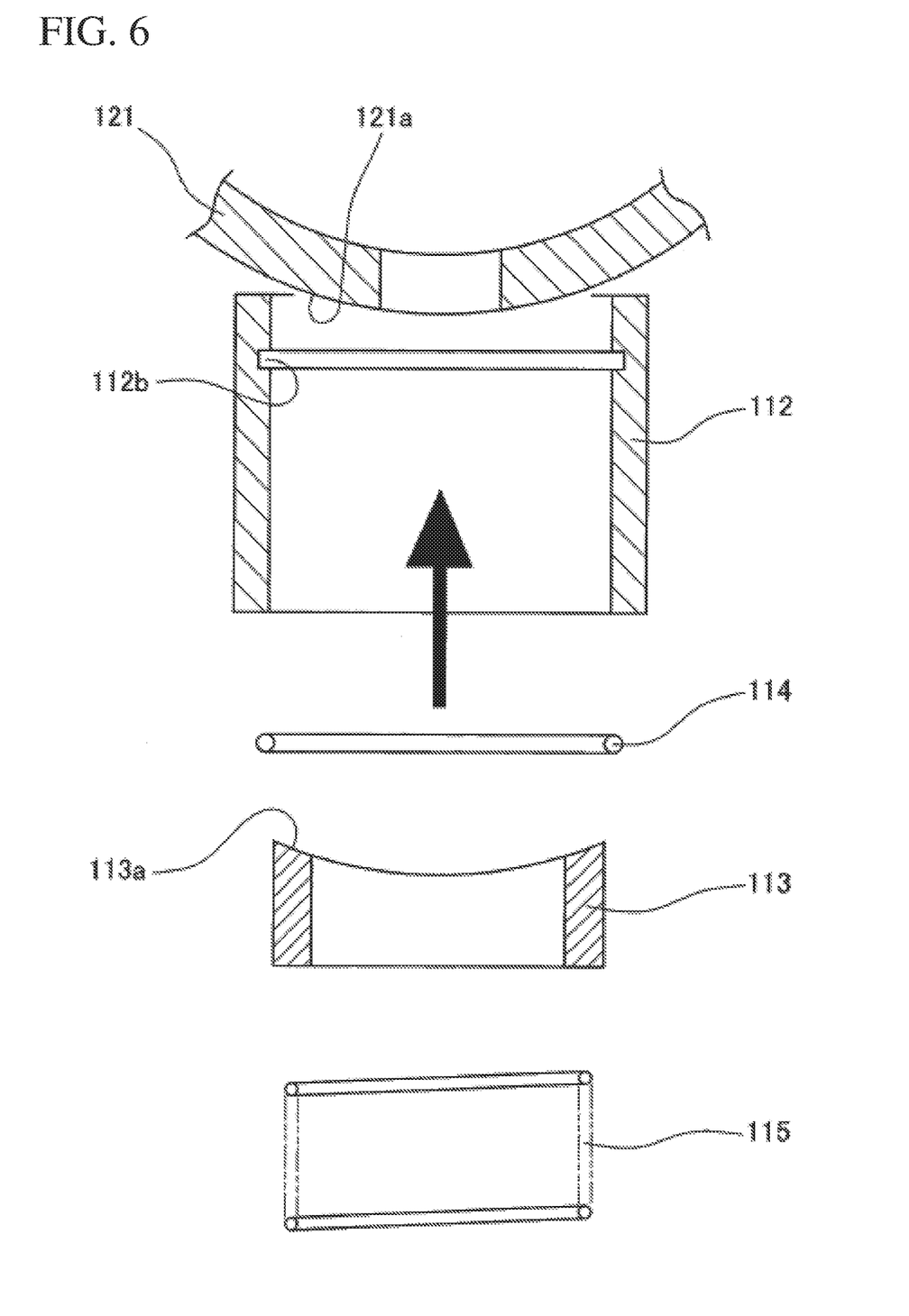
FIG. 6 is an explanatory illustration showing a method of assembling a sealing device of a conventional technique.

On the other hand, in Patent Literature 1, the packing 114 is mounted on a packing mounting groove 112b which is formed at an inner circumferential surface 112a of the housing 112. Accordingly, in assembling the sealing device 111, as shown in FIG. 6, the packing 114 is mounted in advance on the packing mounting groove 112b, and thereafter the seal ring 113 is inserted along the inner circumference of the housing 112.

That is, in inserting the seal ring 113 into the inner circumference of the housing 112, the packing 114 is already mounted on the packing mounting groove 11b. Accordingly, the inserting the seal ring 113 is associated with insert resistance attributed to the elasticity of the insert resistance packing 114. Furthermore, in the subsequent step, in an attempt to accurately align the center axis of the cylindrical surface which is the front-end surface 113a of the seal ring 113 with the center axis of the cylindrical surface which is the outer surface 121a of the valve rotor 121, rotating the seal ring 113 relative to the housing 112 in the ring circumferential direction suffers rotation resistance attributed to the elasticity of the packing 114. These insert resistance and rotation resistance attributed to the elasticity of the packing 114 may be adverse to smooth assembly work.

An object of the present disclosure is to provide a sealing device and a method of assembling the same which are free from insert resistance and rotation resistance attributed to the elasticity of a packing and hence facilitate the assembly work.

Solution to Problem

A sealing device of the present disclosure includes:
a housing;
a seal ring configured to be axially displaceably inserted along an inner circumference of the housing, the seal ring including
a front-end surface and
a rear-end surface defining packing mounting space;
a packing configured to establish sealing between the housing and the seal ring, the packing being disposed in the packing mounting space; and
spring means disposed on the rear-end surface side of the seal ring to elastically bias the seal ring toward the front-end surface side.

A method of assembling a sealing device of the present disclosure includes:
inserting a seal ring into an inner circumference of a housing;
subsequently, inserting a packing into packing mounting space defined by a rear-end surface of the seal ring, to establish sealing between the housing and the seal ring; and
subsequently, inserting, from the rear-end surface side of the seal ring, spring means configured to elastically bias the seal ring toward a front-end surface side of the seal ring.

Advantageous Effects

The present disclosure is free from insert resistance and rotation resistance attributed to the elasticity of a packing and hence facilitates assembly work of a sealing device.

DETAILED DESCRIPTION

First Embodiment

Figure 1:
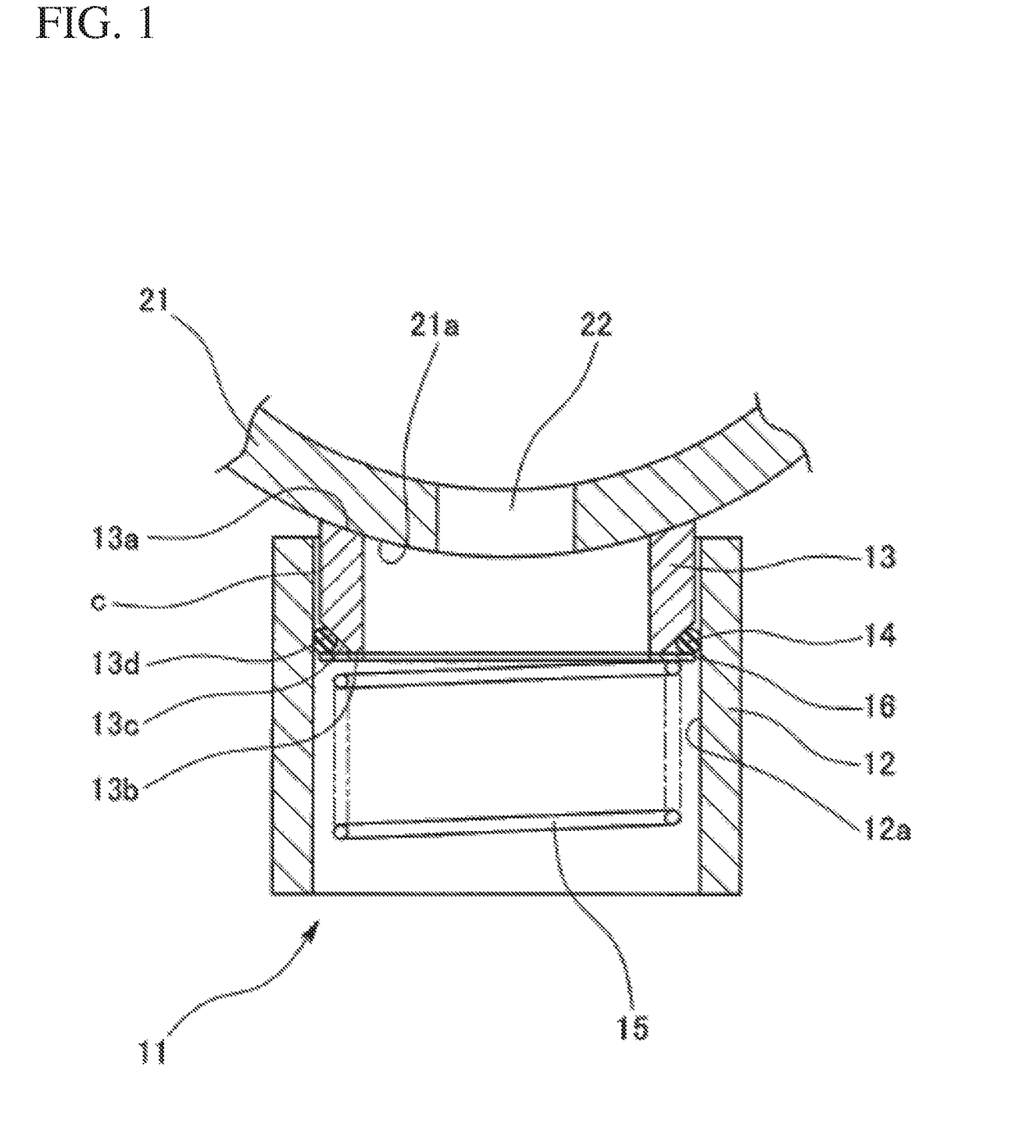
FIG. 1 is a cross-sectional view of a sealing device according to a first embodiment.

With reference to FIG. 1, a description will be given of a sealing device according to the present embodiment. The sealing device 11 according to the present embodiment is a valve-use seal used for a flow control valve which controls fluid such as oil or coolant in the field of automobiles. A valve rotor 21 is a counterpart component with which a seal ring 13 is slidably in contact. The valve rotor 21 has an outer surface 21a which is cylindrical. The outer surface 21a is provided with a plurality of ports 22. Note that, FIG. 1 shows just one port 22.

The sealing device 11 includes a housing (seal housing) 12, a seal ring 13, a packing 14, and spring means 15. The housing 12 is sleeve-like, and has an inner circumferential surface 12a which is cylindrical. The seal ring 13 is inserted along the inner circumference of the housing 12 so as to be axially displaceable, and brought into slidably contact with the outer surface 21a of the valve rotor 21 at a front-end surface 13a (the upper end in FIG. 1). The packing 14 is disposed between the housing 12 and the seal ring 13, to establish sealing against a clearance c between the housing 12 and the seal ring 13. The packing 14 is, for example, an 0 ring. The spring means 15 is disposed on the rear-end surface 13b side (in FIG. 1, the lower end side) of the seal ring 13, and elastically biases the seal ring 13 toward the valve rotor 21. The spring means 15 is, for example, a coil spring.

The seal ring 13 is formed of a member whose coefficients of friction is low, such as PTFE (polytetrafluoroethylene).

Figure 2A:
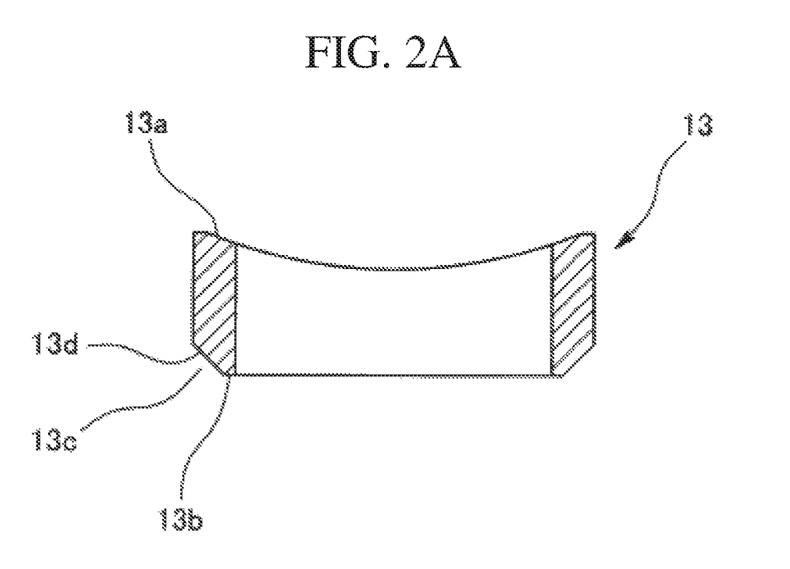
FIG. 2A is a cross-sectional view of a seal ring according to a first embodiment.
Figure 2B:
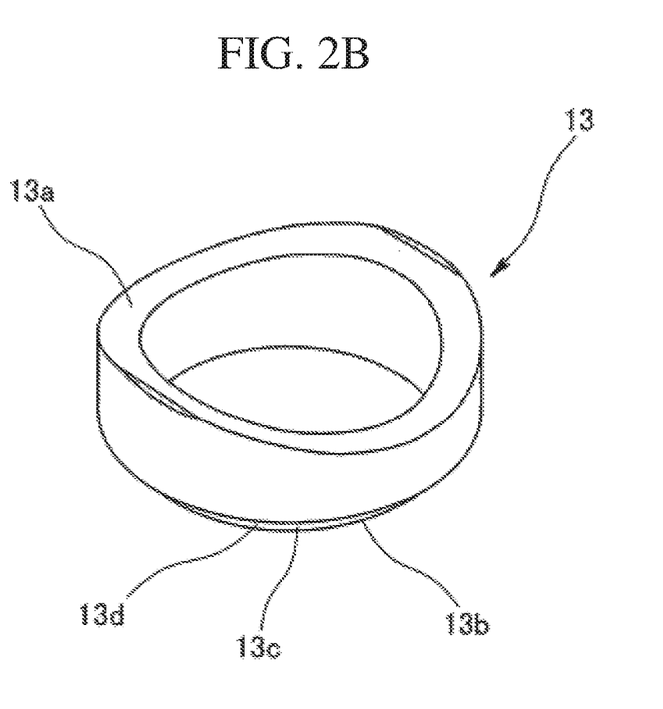
FIG. 2B is a perspective view of the seal ring.

As shown in FIGS. 2A and 2B, corresponding to the outer surface 21a of the valve rotor 21 which is a cylindrical surface, the front-end surface 13a of the seal ring 13 is a corresponding cylindrical surface over the entire ring circumference so as to establish contact with the outer surface 21a of the valve rotor 21.

At the rear-end surface 13b of the seal ring 13, an annular tapered surface 13d is formed. Thus, annular packing mounting space 13c for mounting the packing 14 is defined at the rear-end surface 13b of the seal ring 13. That is, the packing mounting space 13c is defined as space whose cross section is triangular. When the packing 14 is mounted on the packing mounting space 13c, the packing 14 is brought into contact with the tapered surface 13d of the seal ring 13 and the inner circumferential surface 12a of the housing 12, to establish sealing against the clearance c between the housing 12 and the seal ring 13.

Here, the seal ring 13 including the tapered surface 13d exhibits excellent moldability in the case where a powder material such as PTFE is packed into a mold assembly and molded.

In order to prevent the packing 14 from coming off from the packing mounting space 13c, the rear-end surface 13b of the seal ring 13 may be combined with a plate-like stopper ring 16. In this case, the spring means 15 elastically biases the seal ring 13 via the stopper ring 16. While not shown in the drawings, a stopper ring as a spring bearing for supporting the rear end of the spring means 15 may be subsequently combined with the inner circumference of the rear end of the housing 12.

Figure 3:
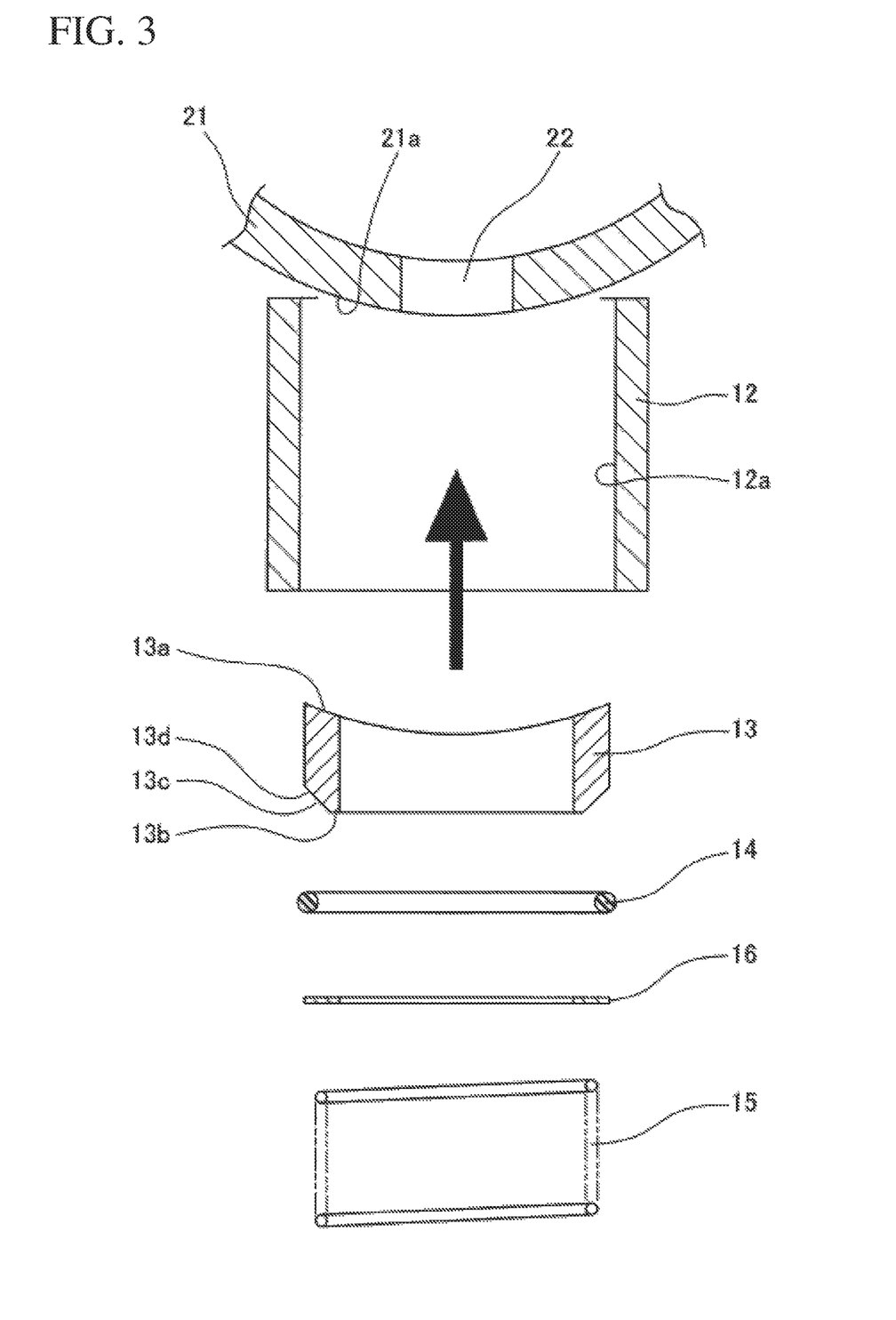
FIG. 3 is an explanatory illustration showing a method of assembling a sealing device according to the first embodiment.

Next, with reference to FIG. 3, a description will be given of a method of assembling the sealing device 11 according to the present embodiment. Firstly, the seal ring 13 is inserted from the rear end side of the housing 12. Next, from the rear end side of the housing 12, the packing 14 is inserted into the packing mounting space (13c). Next, the stopper ring 16 is inserted from the rear end side of the housing 12. Finally, the spring means 15 is inserted from the rear end side of the housing 12.

The inserting the stopper ring 16 may be omitted.

After the inserting the spring means 15, the stopper ring may be inserted from the rear end side of the housing 12.

According to the present embodiment, the seal ring 13 is inserted before the packing 14 is mounted on the inner circumference of the housing 12. Thus, the inserting the seal ring 13 is free from insert resistance or rotation resistance attributed to the elasticity of the packing 14, which contributes to smooth assembly work of the sealing device 11.

Second Embodiment

Figure 4:
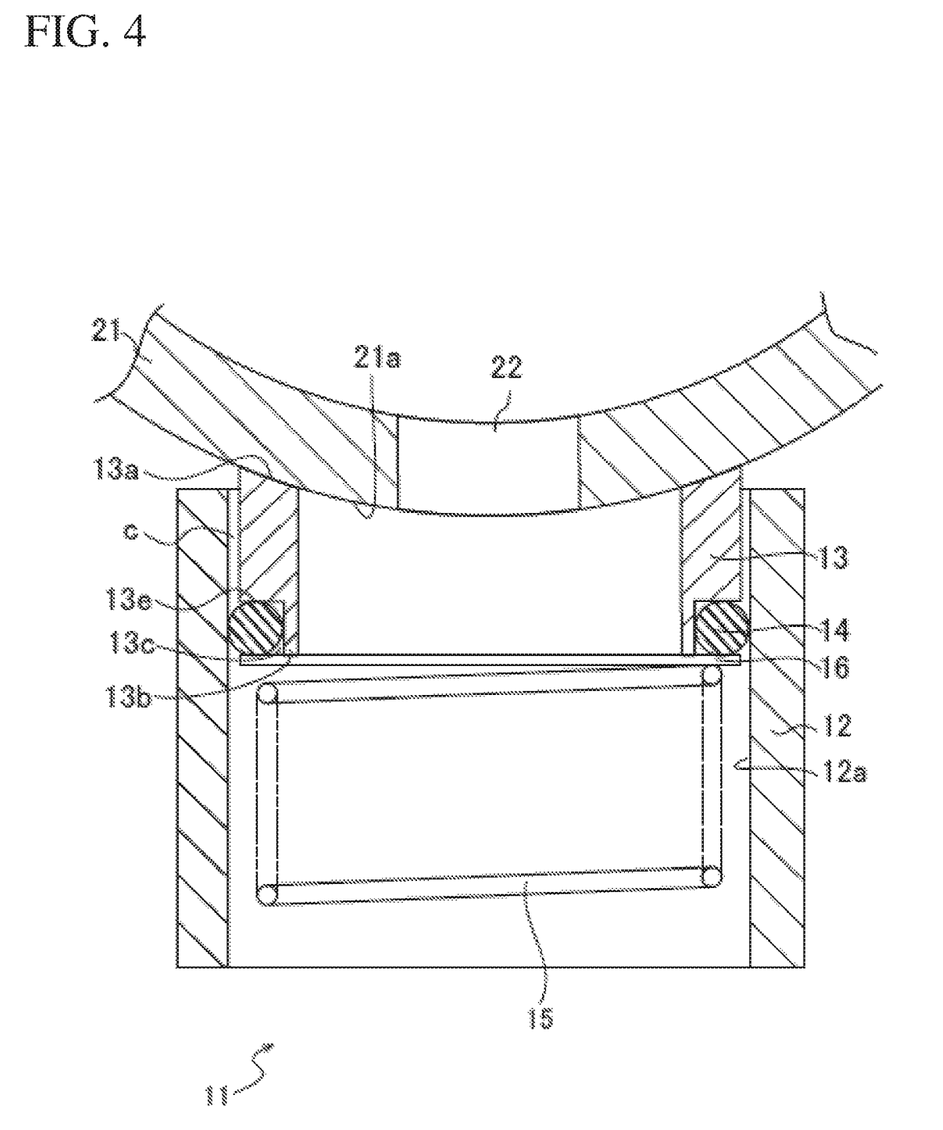
FIG. 4 is a cross-sectional view of a sealing device according to a second embodiment.

With reference to FIG. 4, a description will be given of a sealing device according to the present embodiment. Note that, the structure of the sealing device according to the present embodiment is basically similar to the sealing device according to the first embodiment. Accordingly, a structure identical to that in the first embodiment is denoted by an identical reference numeral to omit the detailed description thereof. Hereinafter, a description will be given of a structure different from that in the first embodiment.

Specifically, the sealing device 11 according to the present embodiment is different from the first embodiment in the structure of the rear-end surface 13b of the seal ring 13. At the rear-end surface 13b of the seal ring 13 according to the present embodiment, an annular groove 13e having a quadrangular cross section is formed. That is, the packing mounting space 13c is defined as space whose cross section is quadrangular. When the packing 14 is mounted on the packing mounting space 13c, the packing 14 is brought into contact with the groove 13e of the seal ring 13 and the inner circumferential surface 12a of the housing 12, to establish sealing against the clearance c between the housing 12 and the seal ring 13.

Next, a description will be given of a method of assembling the sealing device 11 according to the present embodiment. Firstly, the seal ring 13 is inserted from the rear end side of the housing 12. Next, from the rear end side of the housing 12, the packing 14 is inserted into the packing mounting space (13c) defined by the groove 13e. Next, the stopper ring 16 is inserted from the rear end side of the housing 12. Finally, the spring means 15 is inserted from the rear end side of the housing 12.

The inserting the stopper ring 16 may be omitted.

After the inserting the spring means 15, the stopper ring may be inserted from the rear end side of the housing 12.

Similarly to the first embodiment, according to the present embodiment, the seal ring 13 is inserted before the packing 14 is mounted on the inner circumference of the housing 12. Thus, the inserting the seal ring 13 is free from insert resistance or rotation resistance attributed to the elasticity of the packing 14, which contributes to smooth assembly work of the sealing device 11.

REFERENCE SIGNS LIST 11 sealing device
12 housing
12a inner circumferential surface
13 seal ring
13a front-end surface
13b rear-end surface
13c packing mounting space
13d tapered surface
13e groove
14 packing
15 spring means
16 stopper ring
21 valve rotor (counterpart component)
21a outer surface
22 port
c clearance

The invention claimed is:

1. A sealing device, comprising:
   a housing having
      a cylindrical innermost circumferential surface,
      a first end to which a counterpart component is disposed, and
      a second end opposite to the first end;
   a seal ring having an outermost circumferential surface, the seal ring is configured to be axially displaceably inserted from the second end of the housing along the cylindrical inner innermost circumferential surface of the housing, a diameter of the cylindrical innermost circumferential surface of the housing is larger than a diameter of the outermost circumferential surface of the seal ring, and a maximum length, in an axial direction, of the cylindrical innermost circumferential surface of the housing is larger than a maximum length, in the axial direction, of the outermost circumferential surface of the seal ring,
   the seal ring including
      a front-end surface located toward the first end of the housing, and
      a rear-end surface defining a packing mounting space, the rear-end surface located toward the second end of the housing;
   a packing configured to establish sealing between the housing and the seal ring, the packing being disposed in the packing mounting space from the second end of the housing; and
   a spring disposed on the rear-end surface side of the seal ring to elastically bias the seal ring toward the front-end surface side.

2. The sealing device according to claim 1, wherein the rear-end surface has a tapered surface which defines the packing mounting space.

3. The sealing device according to claim 2, further comprising a stopper ring disposed between the seal ring and the spring.

4. The sealing device according to claim 3, wherein the stopper ring abuts the packing.

5. The sealing device according to claim 1, wherein the rear-end surface has a groove which defines the packing mounting space and has a quadrangular cross section.

6. The sealing device according to claim 5, further comprising a stopper ring disposed between the seal ring and the spring.

7. The sealing device according to claim 6, wherein the stopper ring abuts the packing.

8. The sealing device according to claim 1, further comprising a stopper ring disposed between the seal ring and the spring.

9. The sealing device according to claim 1, wherein
   the cylindrical innermost circumferential surface of the housing surrounds an outer surface of the seal ring.

10. The sealing device according to claim 9, wherein
    the packing establishes sealing between the cylindrical inner circumferential surface of the housing and the outer surface of the seal ring.

11. A method of assembling a sealing device, the method comprising:
    providing a seal ring having an outermost circumferential surface,
    configuring the seal ring to be axially displaceably inserted from a second end of a housing along a cylindrical innermost circumferential surface of the housing, providing a diameter of the cylindrical innermost circumferential surface of the housing to be larger than a diameter of the outermost circumferential surface of the seal ring, and
    providing a maximum length, in an axial direction, of the cylindrical innermost circumferential surface of the housing to be larger than a maximum length, in the axial direction, of the outermost circumferential surface of the seal ring;
    inserting the seal ring into the cylindrical innermost circumferential surface of the housing;
    subsequently, inserting a packing into a packing mounting space defined by a rear-end surface of the seal ring, to establish sealing between the cylindrical innermost circumferential surface of the housing and an outermost circumferential surface of the seal ring; and
    subsequently, inserting, from the rear-end surface side of the seal ring, a spring configured to elastically bias the seal ring toward a front-end surface side of the seal ring.

* * * * *